United States Patent [19]
Ferneding

[11] Patent Number: 6,116,302
[45] Date of Patent: Sep. 12, 2000

[54] TREE HARVESTING MACHINE WITH IMPROVED POWER LINE HANDLING

[75] Inventor: Robert A. Ferneding, Woodland, Wash.

[73] Assignee: Denharco Inc., Saint-Hyacinthe, Canada

[21] Appl. No.: 09/280,837

[22] Filed: Mar. 30, 1999

[51] Int. Cl.$^7$ .................................... A01G 23/08
[52] U.S. Cl. ........................ 144/4.1; 144/24.13; 144/336; 144/34; 144/43; 414/718
[58] Field of Search .................. 144/4.1, 24.13, 144/34.1, 335, 336, 343; 414/686, 718

[56] References Cited

U.S. PATENT DOCUMENTS

| | | | |
|---|---|---|---|
| 3,635,266 | 1/1972 | Eriksson | 144/24.13 |
| 4,276,918 | 7/1981 | Sigouin | 144/24.13 |
| 4,350,189 | 9/1982 | Duchesne | 144/24.13 |
| 4,413,661 | 11/1983 | Marchildon | 144/24.13 |
| 4,919,175 | 4/1990 | Samson | 144/24.13 |
| 5,568,829 | 10/1996 | Crawford et al. | 144/4.1 |

*Primary Examiner*—W. Donald Bray

[57] ABSTRACT

A tree harvesting machine having a fixed length boom slidable through a tubular support on the machine. Tree harvesting elements are on one end of the boom. A pair of boom tensioning cables, above the boom, extend between the ends of the boom. Flexible power supply lines extend between the tubular support and the tree harvesting elements, the lines supported in zig-zag fashion between the cables on power line carrying means slidable on the cables. A flexible strap extends between the the ends of the boom, located between the cables, to support the power lines passing between the cables.

17 Claims, 2 Drawing Sheets

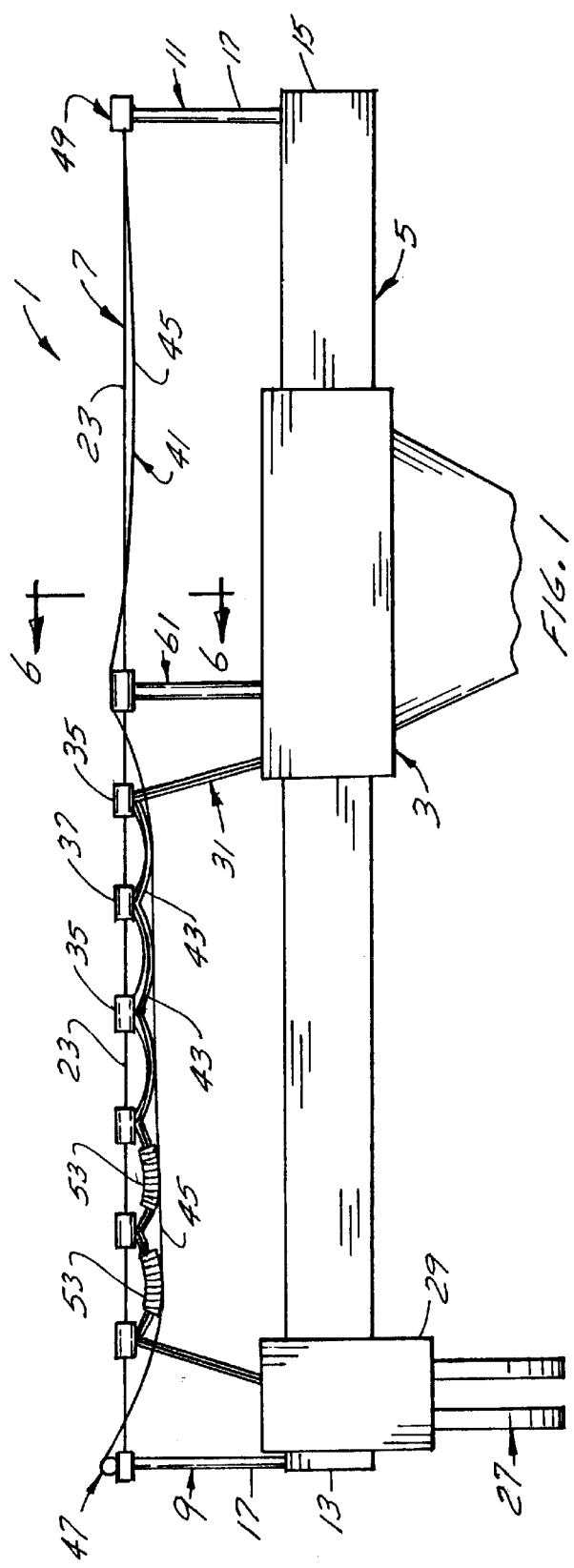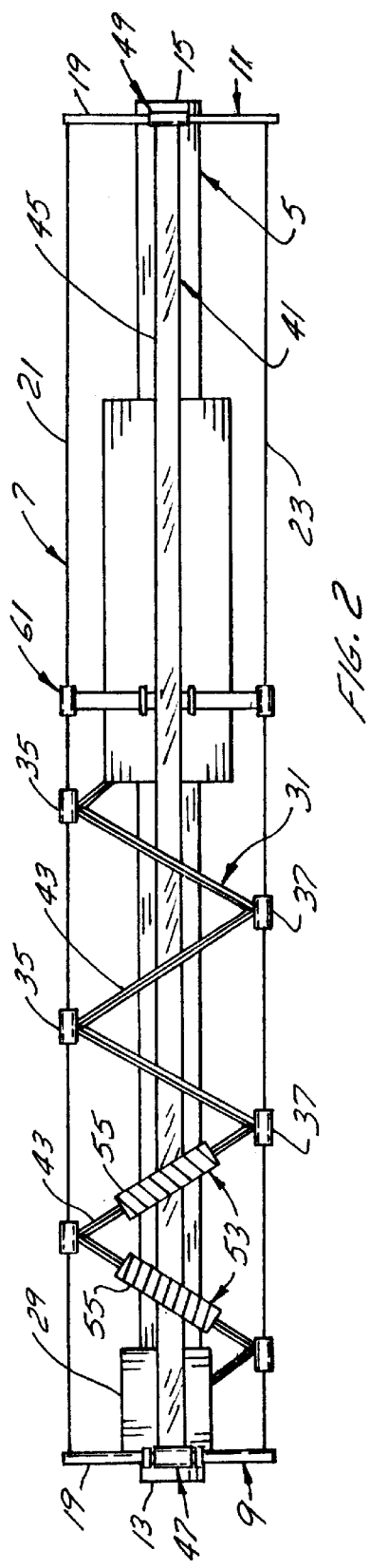

TREE HARVESTING MACHINE WITH IMPROVED POWER LINE HANDLING

BACKGROUND OF THE INVENTION

1. Field of the Invention

This invention is directed toward a tree harvesting machine with improved power line handling.

The invention is more particularly directed toward a tree harvesting machine with a fixed length boom and support means for the power lines on the boom.

The invention is also directed toward a kit for providing a fixed length boom in a tree harvesting machine with power line support means.

2. Description of the Related Art Including Information Disclosed Under CFR §§1.97-1.92

Fixed length booms used in tree harvesting machines are often strengthened by mounting tensioning cables between cable supports at the ends of the booms. The tensioning cables are located above the boom and to either side of it and, when tensioned between the cable supports, strengthen the boom against bending.

The tensioning cables are often used to support the power supply lines which provide power to tree harvesting elements on a harvesting head located at one end of the boom. The power supply lines supply power to the harvesting head from a vehicle carrying the boom via a tubular support through which the boom is movably mounted. Since the tensioning cables are located above the boom, they are normally used to support the power supply lines out of the way, above the boom, during its movement through the support. Carrying elements are slidably mounted on the cables and the power lines are mounted in zig-zag fashion between the cables on the carrying elements. The power lines straighten or gather between the cables as the boom moves relative to the support.

The manner of supporting the power lines on the tensioning cables, through the carrying elements slidably mounted on the cables, works satisfactorily. However, the carrying elements wear out quickly and it is difficult to service or replace the elements, particularly in the field.

SUMMARY OF THE INVENTION

It is the purpose of the present invention to provide simple, support means for the power lines which support means reduce the loading on the cable carrying elements and thus reduces their wear, extending their life, and reducing maintenance costs. The support means for the power lines are simple and thus inexpensive; easy to install, even on existing machines; and easily maintained and replaced, even in the field.

The support means in accordance with the present invention comprises a wide, flexible, strap that is mounted between the centers of the cable supports at the ends of the boom, the strap running under the power lines which extend in zig-zag fashion between the cables. The strap is located about midway between the cables and extends straight between the cable supports. The strap can be tensioned to carry a good deal of the weight of the power lines between the cables thus reducing the loading on the cable carrying elements mounted on the cables.

The invention is particularly directed toward a tree harvesting machine having a fixed length boom slidably mounted through a tubular support on the machine. Tree harvesting elements are on one end of the boom. Cable tensioning means extend between the ends of the boom, the cable tensioning means comprising a pair of cables supported on cable supports at the ends of the boom. The cables extend above and to the sides of the boom. Flexible power supply lines extend between the tubular support and the one end of the boom bringing power to the tree harvesting elements. A plurality of power line carrying elements are slidably mounted on the cables carrying the power lines in zig-zag fashion between the support and the one end of the boom. Power line support means extend between the cable supports on the ends of the boom, the support means located between the cables to support the power line passing between the cables.

BRIEF DESCRIPTION OF THE DRAWINGS

FIG. 1 is side view of a fixed length boom;

FIG. 2 is a top view of the boom;

Figure 3:
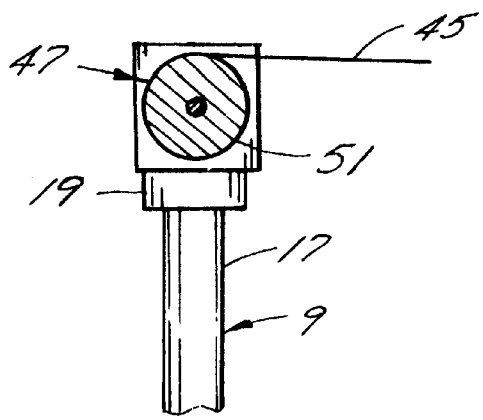
FIG. 3 is a detail side view, in partial section, of the front cable support on the boom.

The tree harvesting machine 1, as shown in FIGS. 1 and 2, has a tubular boom support 3 that is pivotably mounted on a vehicle (not shown). A fixed length boom 5 is slidably mounted through the support 3. Suitable cooperating drive means (not shown) are provided on the support 3 and the boom 5 for moving the boom 5 back and forth through the support 3.

When the boom 5 is quite long it usually employs tensioning means 7 located above the boom to strengthen it. The tensioning means can comprise a pair of cable supports 9, 11, one at each end 13, 15 of the boom 5. Each cable support 9, 11 is T-shaped with a vertical support post 17 and a top cross-bar 19. The cable supports 9, 11 support a pair of tensioning cables 21, 23 between them. The cables 21, 23 extend between the ends of the cross-bars 19 on the supports 9, 11 and are located above the boom and to either side of it, the cables passing over the tubular support 3. Suitable means (not shown) on the cross-bars 19 of the cable supports 9, 11 attach and adjustably tension the cables 17, 19 to strengthen the boom 5 against bending.

Tree harvesting elements, such as gripping and delimbing arms 27, are provided on a delimbing head 29 at one end 13 of the boom 5. Power supply lines 31 bring power to the delimbing head 29, for operating the delimbing arms 27, from the vehicle via the tubular support 3. The power lines 31 are normally hydraulic lines. A plurality of power line carrying elements 35, 37 are slidably mounted on the cables 21, 23 respectively. The power lines 31 are mounted in zig-zag fashion between the cables 21, 23 on the carrying elements 35, 37 in passing from the tubular support 3 to the delimbing head 29. The power lines 31 are straightened or gathered between the cables 21, 23 as the boom 5 moves back and forth relative to the support 3 in harvesting trees. The machine described above is known.

Figure 4:
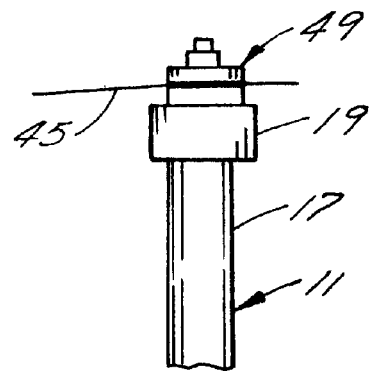
FIG. 4 is a detail side view of the rear cable support on the boom.

In accordance with the present invention, power line support means 41 are provided for supporting the lengths 43 of power lines 31 extending between the cables 21, 23. The support means 41 extends between the cable supports 9, 11 on the ends of the boom 5 and preferably comprises a flexible strap 45 extending between mounting means 47, 49 on the cable supports 9, 11 respectively. The strap 45 passes under the power lines 31 and is about midway between the cables. The strap 45 supports the lengths 43 of power lines 31 extending between the carrying elements 35, 37 on the cables 21, 23. One of the mounting means 47 comprises a winch 51 to which one end of the strap 45 is attached, as shown in FIG. 3, the winch 51 mounted in the center of the top cross-bar 19 on the cable support 9. The winch 51 is used to tighten the strap 45. The other end of the strap 45 is fixedly mounted on the other mounting means 49, mounted in the center of the top cross-bar 19 on the other cable support 11 as shown in FIG. 4.

The strap 45 supports the lengths 43 of the power lines 31 in their approximate centers. This support lessens the loading on the carrying elements 35, 37 providing them with longer life and reducing their maintenance. The lengths 43 of the power lines 31 slide easily on the top of the strap 45 as the lines are straightened or gathered during movement of the boom 5 relative to the support 3.

Preferably sleeves 53 can be provided on the central portion of the lengths 43 of the power lines 31. The sleeves 53 slide on the top of the strap 45 instead of the power lines 31 and thus reduce the wear on the power lines due to sliding on the strap. The sleeves 53 preferably are formed from straps 55 wrapped about the lengths 43 of the power lines. The straps 55, preferably made from plastic material, can be detachably fastened to themselves or to the lengths of the power lines. The straps 55 are easily replaced when they become worn.

Figure 5:
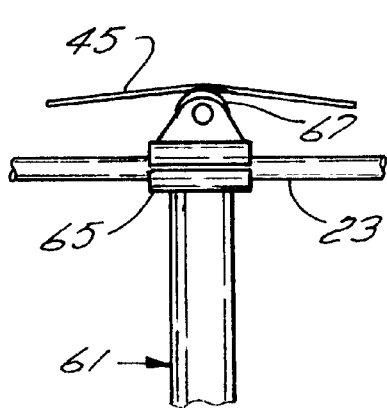
FIG. 5 is detail side view of the intermediate cable support on the boom.
Figure 6:
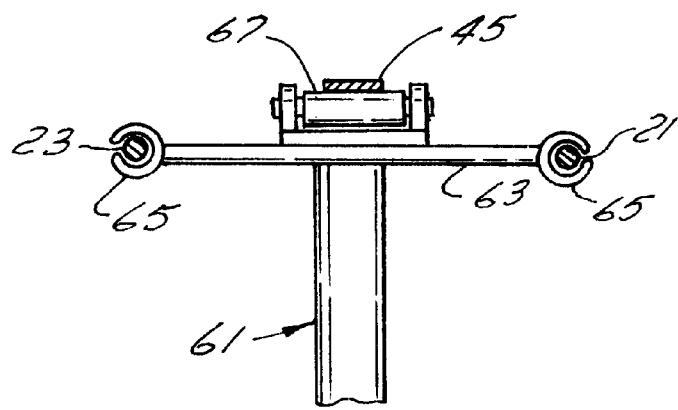
FIG. 6 is a cross-section view taken along line 6—6 in FIG. 1.

If the boom 5 is long, it may have an intermediate cable support 61 extending up from the tubular support 3 to support the cables 21, 23 intermediate their ends as shown in FIGS. 5 and 6. The cables can freely pass though openings on the ends 65 of the top cross-bar 63 of the intermediate support 61. A roller 67 can be mounted on the center of the cross-bar 63, on the top, to also support the strap 45.

The power line support means described has been incorporated on the boom during its manufacture. However, the support means can also be provided in kit form and installed on existing machines. The support means can be easily installed on existing machines in the field. The kit comprises the strap 45, the mounting means 47, 49, the roller 65 and a plurality of straps to form the sleeves 53. The mounting means 47, 49 are easily installed on the cross-bars of the cable supports on existing machines using simple tools, as is the roller 65 if required.

The present invention is described in connection with a tree harvesting machine but it could be used with any other machines employing fixed length booms and tensioning cables.

I claim:

1. A tree harvesting machine having:
  a fixed length boom slidable through a tubular support on the machine, the boom having spaced-apart ends;
  tree harvesting elements on one end of the boom;
  boom tensioning means extending between the ends of the boom, the boom tensioning means comprising a pair of cables supported above and to the sides of the boom;
  flexible power supply lines extending between the tubular support and the one end of the boom bringing power to the tree harvesting elements;
  a plurality of power supply line carrying means slidably mounted on the cables carrying the power supply lines in zig-zag fashion between the tubular support and the one end of the boom; and
  power supply line support means extending between the ends of the boom, the power supply line support means separate from, and located between, the cables to support the power supply lines passing between the cables.

2. A harvesting machine as claimed in claim 1 wherein the line support means comprises a flexible strap.

3. A harvesting machine as claimed in claim 2 wherein the boom tensioning means includes cable supports at the ends of the boom, the strap extending between the cable supports.

4. A harvesting machine as claimed in claim 3 including strap mounting means on the cable supports.

5. A harvesting machine as claimed in claim 4 wherein one of the strap mounting means comprises a winch mounted on one cable support.

6. A harvesting machine as claimed in claim 1 including an intermediate cable support mounted on the tubular support, the intermediate cable support supporting the line support means.

7. A harvesting machine as claimed in claim 2 including an intermediate cable support mounted on the tubular support, the intermediate cable support supporting the flexible strap.

8. A harvesting machine as claimed in claim 6 including a roller mounted on the top of the intermediate cable support, the line support means passing over the roller.

9. A harvesting machine as claimed in claim 7 including a roller mounted on the top of the intermediate cable support, the strap passing over the roller.

10. A harvesting machine as claimed in claim 1 including replaceable sleeve sections mounted on the sections of the power lines passing between the cables, the sleeve sections resting on the line support means.

11. A harvesting machine as claimed in claim 2 including replaceable sleeve sections mounted on the central sections of the power lines passing between the cables, the sleeve sections resting on the strap.

12. A power line support kit for a tree harvester, the tree harvester having a fixed length boom with spaced-apart ends and with tree harvesting machine elements at one end of the boom; a tubular support through which the boom passes; tensioning means for the boom comprising a cable support at each end of the boom, a pair of cables extending between the supports, the cables located over the boom and to each side; flexible power supply lines extending between the tubular support and the one end of the boom; and power supply line carrying elements slidable on the cables and carrying the power supply lines in zig-zag fashion between the cables; the kit comprising: power supply line support means, separate from the cables, and slightly longer than the distance between the cable supports; first mounting means for mounting on one of the cable supports; second mounting means for mounting on the other cable support; the power supply line support means attachable to the first and second mounting means to extend under the power supply lines between the cables in a position to support them.

13. A kit as claimed in claim 12 wherein the wherein the line support means comprises a flexible strap.

14. A kit as claimed in claim 12 wherein the first mounting means comprises a small winch.

15. A kit as claimed in claim 13 wherein the first mounting means comprises a small winch.

16. A kit as claimed in claim 12 including replaceable sleeve sections for mounting on power line sections between the cables and overlying the strap when in place.

17. A kit as claimed in claim 13 including replaceable sleeve sections for mounting on power line sections between the cables and overlying the strap when in place.

* * * * *